(12) United States Patent
Brummel et al.

(10) Patent No.: US 10,207,552 B2
(45) Date of Patent: Feb. 19, 2019

(54) DEPLOYABLE CONTAINERS, SYSTEMS AND METHODS FOR DEPLOYING CONTAINERS

(71) Applicant: Holland, L.P., Crete, IL (US)

(72) Inventors: Anthony Brummel, Dyer, IN (US); Michael Murphy, Centennial, CO (US); Benjamin Byma, Dyer, IN (US); Michael Weaver, Lowell, IN (US)

(73) Assignee: Holland, L.P., Crete, IL (US)

( * ) Notice: Subject to any disclaimer, the term of this patent is extended or adjusted under 35 U.S.C. 154(b) by 103 days.

(21) Appl. No.: 15/243,452

(22) Filed: Aug. 22, 2016

(65) Prior Publication Data

US 2017/0225886 A1    Aug. 10, 2017

Related U.S. Application Data

(60) Provisional application No. 62/207,609, filed on Aug. 20, 2015.

(51) Int. Cl.

| | |
|---|---|
| *B65D 90/14* | (2006.01) |
| *B60D 1/66* | (2006.01) |
| *B60D 1/01* | (2006.01) |
| *B62D 63/08* | (2006.01) |
| *B60P 3/32* | (2006.01) |
| *B60T 13/10* | (2006.01) |
| *B65D 90/00* | (2006.01) |
| *B65D 90/18* | (2006.01) |

(52) U.S. Cl.
CPC .............. *B60D 1/66* (2013.01); *B60D 1/01* (2013.01); *B62D 63/08* (2013.01); *B60P 3/32* (2013.01); *B60T 13/10* (2013.01); *B65D 90/00* (2013.01); *B65D 90/18* (2013.01)

(58) Field of Classification Search
CPC .. B60D 1/66; B60D 1/01; B62D 63/08; B60P 3/32; B60T 13/10; B65D 90/00; B65D 90/18
USPC .... 280/43, 43.13, 43.14, 43.17, 43.24, 43.4, 280/43.18, 43.1
See application file for complete search history.

(56) References Cited

U.S. PATENT DOCUMENTS

| | | | | |
|---|---|---|---|---|
| 3,788,683 A | * | 1/1974 | Rumell | B60P 7/132 280/43.14 |
| 4,082,309 A | * | 4/1978 | Fox | B60D 1/32 280/432 |
| 5,050,897 A | * | 9/1991 | Stromberg | B62D 53/067 280/43 |

(Continued)

*Primary Examiner* — Jacob D Knutson
(74) *Attorney, Agent, or Firm* — Stephen T. Scherrer; Monique A. Morneault; Scherrer Patent & Trademark Law, P.C.

(57) ABSTRACT

The present disclosure relates to shipping and storage containers. Specifically, the present disclosure relates to shipping and storage containers, which are traditionally stationary, converted to easily-portable containers. More specifically, the portable containers include a deployable/retractable landing/moving apparatus, a removable tow bar assembly, and leveling support systems. The portable containers can have many uses including as temporary to permanent housing, office space, and school rooms, or to house equipment for use in mobile telecommunication networks and systems, including cellular towers that can be set-up in both permanent and temporary locations.

5 Claims, 5 Drawing Sheets

(56) References Cited

U.S. PATENT DOCUMENTS

| | | | | |
|---|---|---|---|---|
| 5,967,596 A * | 10/1999 | Knoop | ............... | B60P 3/36 |
| | | | | 296/164 |
| 6,439,131 B1 * | 8/2002 | Higgins | ............... | B60F 1/00 |
| | | | | 105/159 |
| 6,939,098 B2 * | 9/2005 | Schults | ............... | B65D 90/146 |
| | | | | 414/459 |
| 7,390,052 B2 * | 6/2008 | Bertoch | ............... | B62D 21/20 |
| | | | | 296/156 |
| 2006/0091640 A1 * | 5/2006 | Reese | ............... | B62D 21/20 |
| | | | | 280/400 |
| 2007/0126209 A1 * | 6/2007 | Wolfe | ............... | B62D 33/03 |
| | | | | 280/656 |
| 2012/0098243 A1 * | 4/2012 | Diaz | ............... | B60S 9/215 |
| | | | | 280/766.1 |
| 2017/0057577 A1 * | 3/2017 | Blevins | ............... | B62D 63/061 |

* cited by examiner

DEPLOYABLE CONTAINERS, SYSTEMS AND METHODS FOR DEPLOYING CONTAINERS

TECHNICAL FIELD

The present invention relates to containers, and systems and methods for moving and deploying containers. More specifically, the present invention relates to containers incorporating a towing assembly mechanism useful for moving the containers, and a deployable/retractable system useful for installing and leveling the containers at a desired location. In this manner, the containers can be set-up in both temporary and permanent locations and serve many functions, for example as temporary or permanent housing, and as portable mobile telecommunication centers and systems.

BACKGROUND

Containers, and specifically, International Standards Organization (ISO) containers are typically used for the transportation and storage of goods. ISO containers are traditionally fully-enclosed, rectangular boxes, and fitted with a pair of hinged access doors at one end, or optionally at both ends or even in the center of the container. The containers are generally 20 feet in length, and 8 ft×8 ft cross-section. ISO containers are durable, are easily filled and emptied, designed for repeated use, and facilitate the carriage of goods using a variety of modes of transportation, including by air, rail, semi-trailer trucks, and freight ships.

Containers that have outlived usefulness as cargo and storage containers, or even new containers may find alternative uses beyond shipping and storage. For example, containers can be used as permanent or temporary office or schoolroom space, are used in construction of homes or restaurants, or may be used to house electronic and mobile telecommunication equipment or used as portable cellular phone towers. Designing mobile telecommunication systems within a portable container provides an opportunity to supply these resources in areas where space is limited and without the need for elaborate construction. Further, the portability offered by these mobile telecommunication containers provides these services in areas where such services may otherwise be unavailable, for example after a natural disaster.

However, typical containers, including ISO containers generally lack the ability for ease of mobility. Typically moving such containers requires a crane to move the container from one location to another, such as to and from a cargo ship, to and from a loading dock and to and from the bed of a railcar. Because most storage and shipping containers are stationary once placed, and do not have wheels and/or support jacks, they are not easily portable without special equipment. Even if provided with rollers or wheels, these containers still require a stable and secure set-up when moved to a specific location, including levelling support, as well as ease in take-down when moving to a new location.

A need, therefore, exists for improved, portable shipping and storage containers.

Specifically, a need exists for improved mobile shipping and storage containers that are easily transported from location to location.

Furthermore, a need exists for providing a container having deployable/retractable systems including deployable/retractable wheels that can be lowered or deployed for moving a container, and retracted when the container is placed in a desired location.

Moreover, a need exists for providing a container having deployable/retractable systems including a leveling support system for secure set-up and levelling the container when placed at an initial location.

Additionally, a need exists for providing a removable tow bar assembly and mechanism useful for moving the container from location to location.

Further a need exists for a mobile telecommunication center for temporary or permanent placement at a remote location, or as a back-up in the event of a natural disaster or other failure of communication systems.

SUMMARY

The present disclosure relates to containers easily portable to a desired location. The portable container can serve, for example, as temporary or permanent housing, or as mobile telecommunication centers, including cellular phone towers, useful in temporary or permanent locations. Specifically, the present containers include a towing assembly and mechanism, and deployable/retractable systems and apparatus for moving the container from location to location, and for securing the container in position. Ease in portability of the container is an advantage provided by the deployable/retractable systems and the towing assembly and mechanism.

To this end, in an embodiment of the present disclosure, a portable container is provided. The portable container comprises an interior space having an opening for accessing the interior space, a deployable/retractable apparatus installed within the interior space, wherein the apparatus is movable between a stowed position within the interior space and a deployed position outside of the interior space, and a tow bar assembly attachable to an outer surface of the container.

The portable container may also include a leveling apparatus, wherein the leveling apparatus is moveable between an upward stowed position within the interior space of the container, and a downward support position outside the interior space of the container.

In another embodiment, the portable container includes a removable, attachable tow bar assembly. The tow bar assembly is easily removed from the container when the container is positioned at a desired location.

A system for converting a stationary unit to a mobile unit, is provided. The system comprises a container having an interior space, a deployable/retractable apparatus disposed within the interior space, wherein the apparatus is adjustable between a horizontal stowed position within the interior space and a vertical deployed position outside of the interior space, a leveling apparatus movable between a upward retracted position within the interior space to a downward extended position outside of the interior space for supporting the container on a landing surface, and, a removable tow bar assembly.

A method for converting a stationary structure to a mobile structure for temporary or permanent staging, is provides. The method comprises the steps of providing a container having an interior space, installing a deployable/retractable wheel apparatus within the interior space, wherein the apparatus is adjustable between an upward stowed position within the interior space and a downward deployed position outside of the interior space, attaching a tow bar assembly to one end of the container, wherein the tow bar assembly is removable when the container is in a stationary position.

It is, therefore, an advantage and objective of the present disclosure to provide a portable modular container having a deployable/retractable system and apparatus, which includes at least one wheel that is easily lowered for moving the container from one location to another location, and retracted when the container is set at a chosen location.

It is yet another advantage and objective of the present disclosure to provide a deployable/retractable system and leveling support apparatus for securing a portable container at a chosen location. The leveling support apparatus can be lowered when setting up the container in a chosen location.

It is a further advantage and objective of the present disclosure to provide a removable tow bar assembly that can be installed and removed without the need for tools.

It is further an advantage and objective of the present disclosure to provide a portable mobile telecommunication center housed in a portable container.

It is a further advantage and objective of the present disclosure to provide temporary or permanent housing, office space or classrooms in a portable container.

Additional features and advantages of the present disclosure are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

The present disclosure relates to portable, deployable shipping and storage containers. The portable, deployable containers can serve many functions, including as permanent and temporary housing, as office space or classrooms, or as mobile telecommunication centers, providing communication systems in remote locations and/or in locations needed communication backup or restoration, such as after a natural disaster. The portable containers include deployable/retractable systems and apparatus, including moving, landing and leveling mechanisms and systems, and a removable tow bar assembly, all of which enhance the portability and setup of the container.

Figure 4:
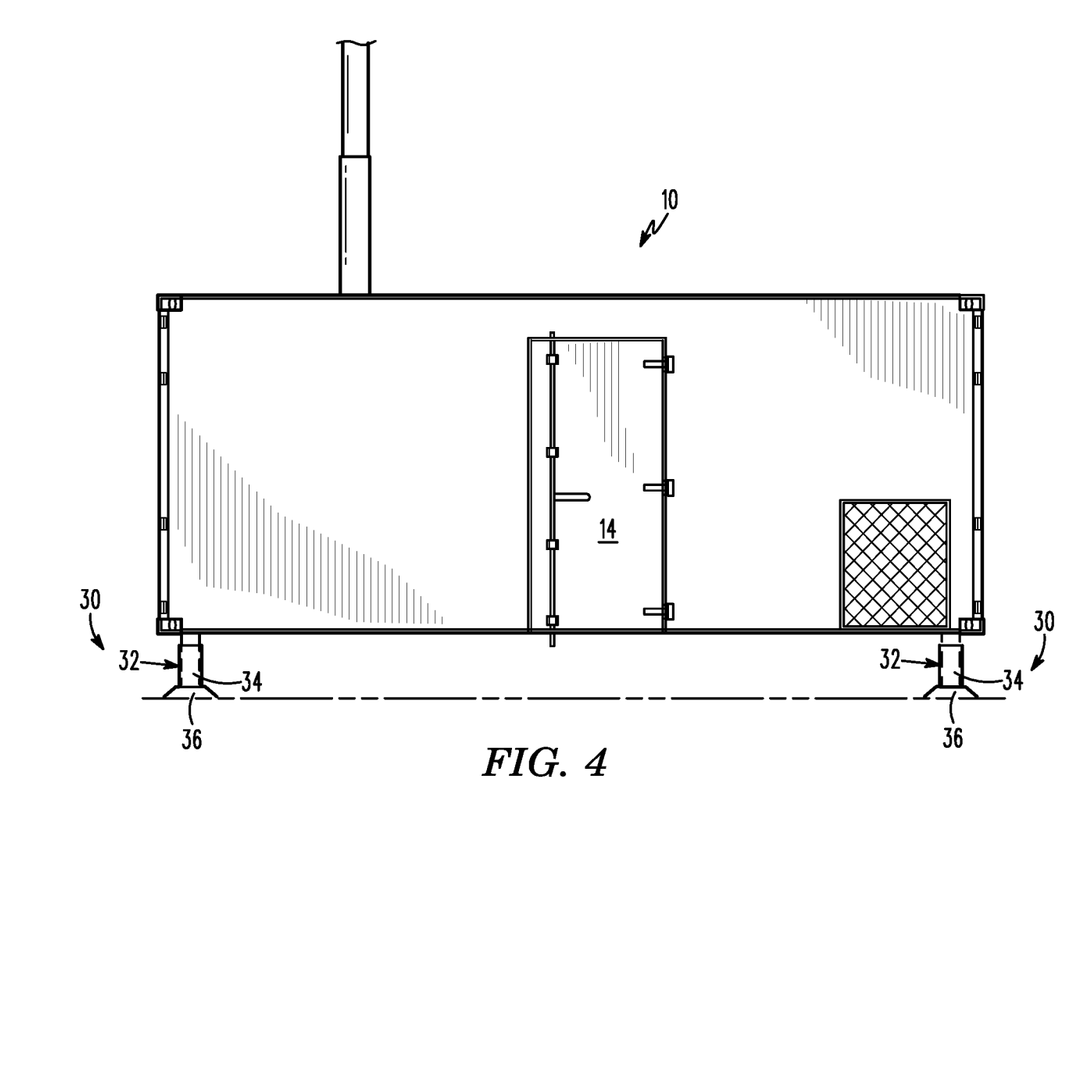
FIG. 4 illustrates a perspective view of the portable container showing the leveling support apparatus of the present disclosure.
Figure 5:
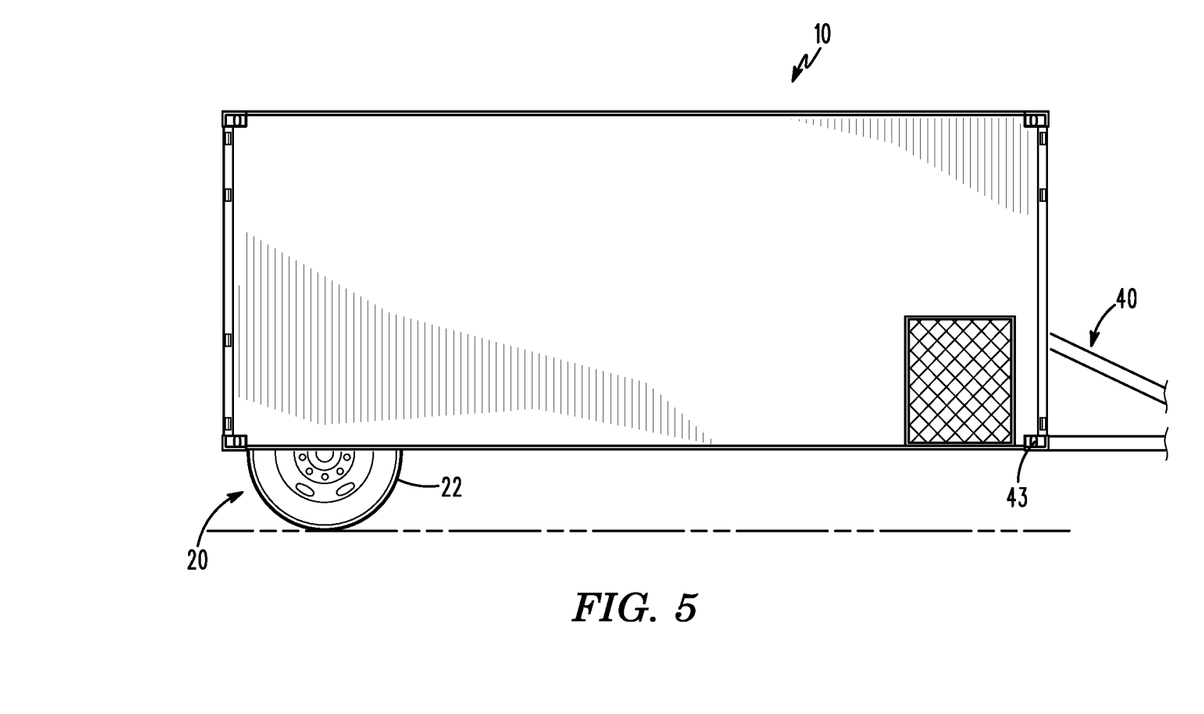
FIG. 5 illustrates a perspective view of another embodiment of the portable container of the present disclosure.

Now referring to the figures, wherein like numerals refer to like parts, FIGS. 1-6a and b illustrate a portable container 10 according to the present disclosure. ISO containers are suitable for use in the present disclosure because ISO containers are traditionally fully-enclosed, rectangular boxes and fitted with a pair of hinged access doors 12 at one end (FIG. 3), or optionally at both ends, or even in the center 14 of the container (FIG. 4). The containers are generally 20 feet in length, and 8 ft×8 ft in cross-section. The container 10 may be constructed from any suitable durable, corrosion-resistant material, including steel, aluminum or plastic. Other shipping container types and sizes might be used. These may include "high cube" containers, 40 foot containers, custom length containers, refrigerated containers, and so on. The configuration of the present deployable/retractable moving system and apparatus 20 would be dependent on anticipated weight of the container, and the type of vehicle towing the container.

Figure 1:
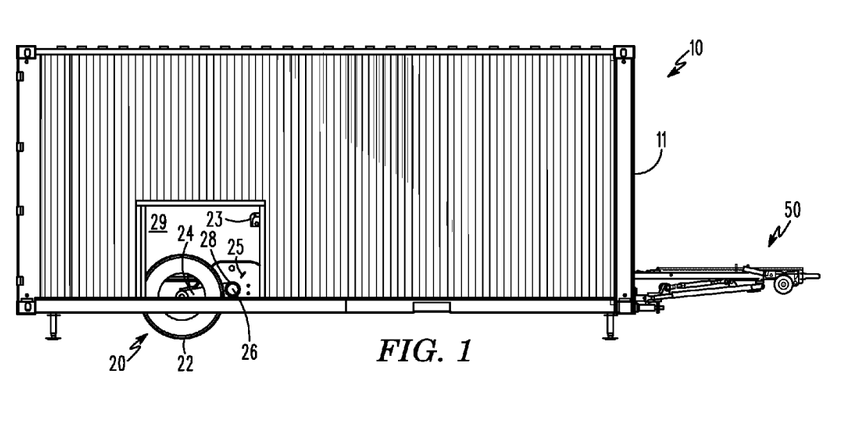
FIG. 1 illustrates a perspective view of the portable container showing the deployable/retractable system and apparatus and tow bar assembly of the present disclosure.

As shown in FIG. 1, the portable container 10 includes a deployable/retractable moving system and assembly 20. Specifically, the deployable/retractable moving system and apparatus 20 includes a set of tires or wheels 22 connected to pivotal arm 24 and an axle 26. A single deployable wheel and axle configuration may be used. For other applications, where more weight must be carried within the container 10, or the weight balance requires different locations, two or more wheels 22 and axle 26 configurations may be used. This could include axles adjacent to one another similar to a tandem axle set-up or an axle in the front of the container or trailer (steer axle) and an axle in the rear of the trailer.

Similar to the wheels of an airplane, the wheels 22 and pivotal arm 24 are movable about the axle 26 between a between a stowed position (FIG. 4) to a deployed position (FIG. 5) using a known gear mechanism (not shown). The gear mechanism may be operated hydraulically, electrically or manually to move the wheels 22 between the stowed position to the deployed position, and vice versa. For example, when the gear mechanism is activated, the axle 26 rotates pulling the associated wheel 22 and associated arm 24 up together into a horizontal stowed position within the body of the container 10. Similarly, for deployment of the wheel 22 and arm 24, the axle 26 rotates about a pivot point 28 lowering arm and wheel together into a vertical, deployed position outside the container. In yet another possible embodiment, the arm 24 of the wheel 22 includes a pivot point or elbow, wherein when the gear mechanism is activated, the arm and wheel pivot about the elbow, folding between a horizontal stowed position and a vertical deployed position.

In another embodiment, a simple procedure for deploying the wheels 22 involves gravity. Initially, the container 10 is lifted off the ground using a leveling support apparatus 30, which includes a deployable/retractable support post or pedestal 32 and a deployment/retracting mechanism (FIG. 4). The support posts 32 lower to the ground, lifting the container 10 off of the ground. The wheels 22 then lower to the ground using gravity. When the container 10 is raised, using the leveling apparatus 30, the wheels 22 are connected to a small winch 23 that allows the user to lower the wheels in a controlled manner after a pin 25 or other securing element has been removed. Once the wheels 22 reach a fully deployed position, the pin 25 is placed back into the deployable/retractable moving assembly 20 to lock the wheels in position. The wheels 22 are pinned in position both while stowed and while deployed. When stowing the wheels 22, the support posts 32 are again deployed downward to hold the weight of the container 10. The pin 25 is pulled from the axle assembly allowing the wheels 22 to be rotated upward into the container. The winch 23 can then be operated in reverse, pulling the wheels 22 into the stowed position within the wheel well 29 of the container 10. Once the wheels reach this position, the pin 25 is inserted to lock the assembly in place. The support posts 32 can also be retracted, lowering the container 10 to the ground, or optionally, the support posts can remain deployed to keep the container a suitable distance off the ground. The described procedure for raising and lowering the container is relatively simple and inexpensive. Optionally, a hydraulic and/or air powered system for moving the wheels 22 up and down may also be used.

Lowering or deploying the wheels 22 enables moving the container 10 from location to location. Similarly, when the container 10 is placed in a temporary or permanent location, the wheels 22 can be retracted into the wheel well 29 located within the body of the container as described using the retractable gear mechanism, winch or other appropriate means. The wheels 22 can be stored and locked into position within the wheel well 29 until there is a need or desire to move the container 10. Optionally, the wheels 22 may be locked in the downward deployed position using the pin as described to prevent the container module 10 from moving.

In another embodiment, when the wheels 22 are retracted, and the container 10 is positioned in a more permanent location, the container may further be supported by the leveling apparatus 30. The leveling apparatus 30 was initially described in connection with raising and lowering the wheels 22. As shown in FIG. 4, the leveling apparatus 30 includes a deployable/retractable support post or pedestal 32 and a deployment/retracting mechanism, such as a gear mechanism, a winch, or a hydraulic or air powered system. The support pedestals 32 are typically positioned on each corner of the container 10. Similar to the operation of wheels 22 moving between a stowed position and a deployed position, the support pedestal 32 are lowered to the ground using the deployment/retracting mechanism when the container 10 is placed in its preferred location and the wheels are retracted into a stowed position, as previously described.

When in the downward, deployed position, the support pedestals 32, which include a support column 34 and a support plate 36, provide a leveling function for the container 10. The support column 34 may house gears or springs (not shown) for adjusting the position of the container in relation to the ground, while the support plate 36 provides a large surface area for supporting the container. For example, once the support pedestals 32 are deployed, they are adjustable hydraulically, manually or electronically from a main control panel (not shown) within the container 10. Each support pedestal 32 is capable of adjustment independently of each other, which would be useful is the surface or ground the container is placed on is uneven. Thus, the adjustability feature of the support pedestals 32 permits locating the container 10 on a variety of terrain and locations.

Figure 2:
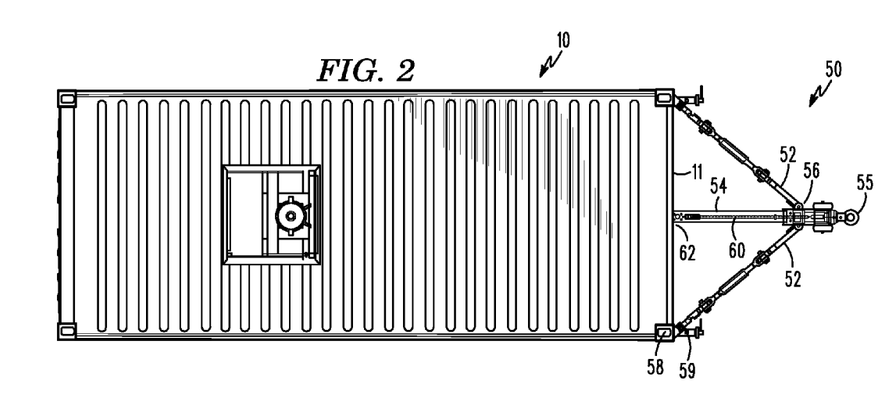
FIG. 2 illustrates a top perspective view of the portable container showing the tow bar assembly of the present disclosure.
Figure 3:
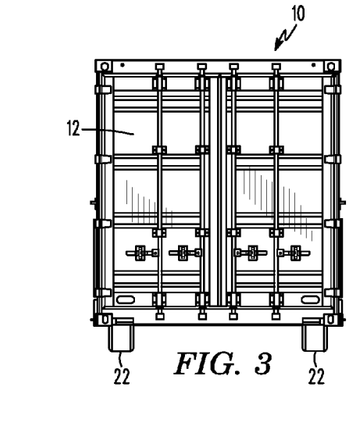
FIG. 3 illustrates a back view of the portable container of the present disclosure.
Figure 6A:
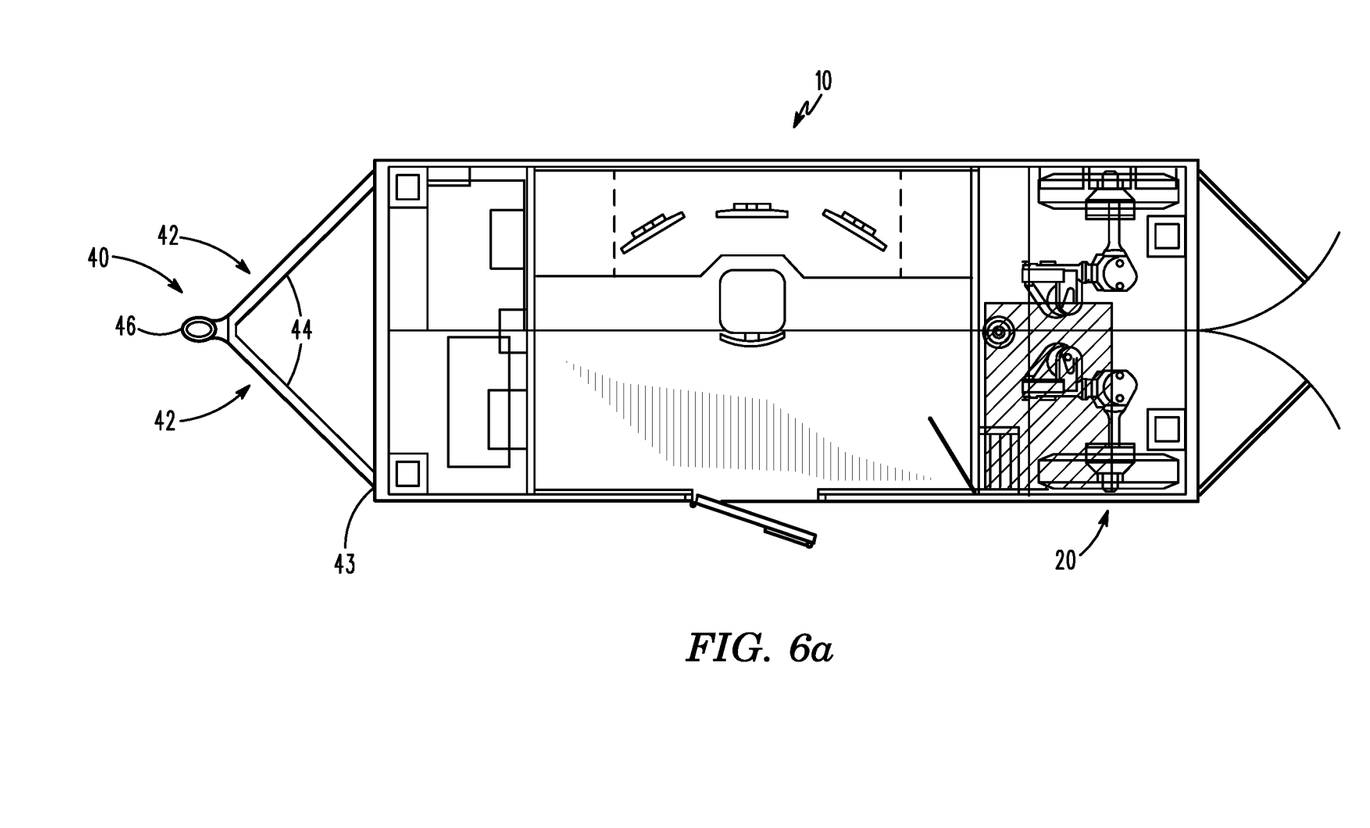
FIG. 6a illustrates a plan view and FIG. 6b illustrates an elevation view of a portable container of the present disclosure in use as a telecommunication center.
Figure 6B:
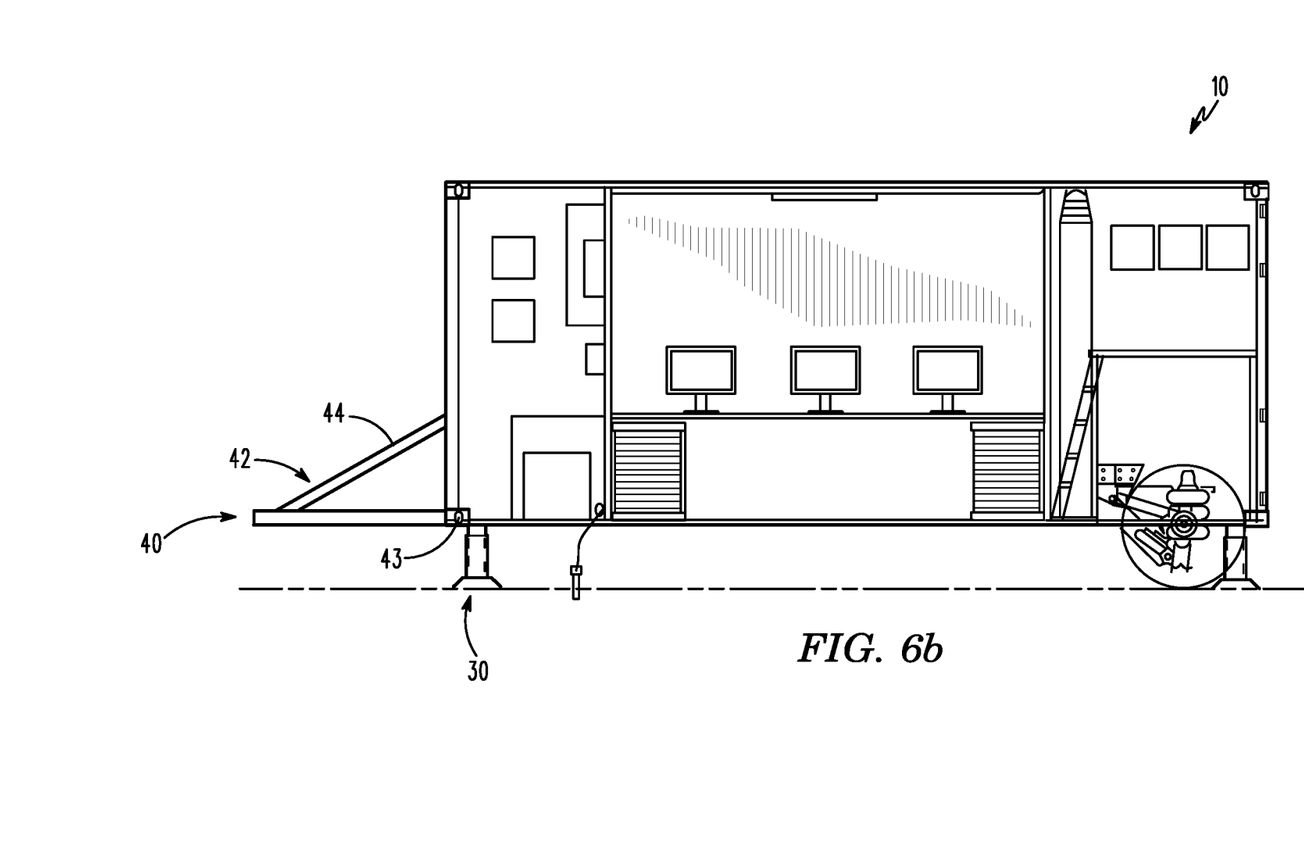

Moving the container 10 from location to location when the wheels 22 are deployed is accomplished through use of a removable tow bar or tongue assembly 40. FIG. 2 and FIGS. 6a and 6b illustrate different possible embodiments of a tow bar assembly 40, typically located on one end of the container 10. As shown in FIG. 6a, the tow bar assembly 40 has a generally A-shaped main frame 42 having opposing legs 44, with either leg of the frame attaching to opposing sides of one end of the container body 10 at attachment points 43 (FIG. 5) using known attachment devices or welding. The tow bar assembly 40 may be capable of pivotal movement at the attachment point 43, such that the tow bar assembly can be secured in an upright position on the container when not in use, and pivoted downward to a generally horizontal position when in use to move the container. In this embodiment, the tow bar assembly includes a pintle hook 46 or other appropriate towing mechanism at the apex of the A-shaped frame 42, which can be used to secure the container to an appropriate towing vehicle.

FIG. 2 shows another embodiment of the tow bar (or tongue) assembly 50. In this preferred embodiment, the tongue assembly 50, having outer legs 52 forming an A-shape with a central beam 54 connected at one end at an apex 56 of the legs, is designed to be removable from the container 10. When the container is being stored, or does not need to be moved by tow vehicle, the tongue assembly 50 can be removed and securely stored inside the container, as needed. The tongue assembly 50 utilizes the corner casting blocks 58 that are common to all ISO style shipping containers 10 for attachment points. The outer legs 52 of the tongue assembly are attached to the corner blocks 58 using special twist-lock devices 59 that are inserted into the corner blocks and then tightened to lock the arms to the blocks. The legs 52 are then attached to the central beam 54 of the tongue assembly 50, which is attached to a front wall 11 of the container 10.

At the end opposite the wall attachment, the central beam 54 has the lunette ring 55 for attachment to the pintle hitch of the tow vehicle (not shown). The lunette ring 55 could be exchanged for another appropriate type of coupler. The central beam 54 also contains a known internal brake booster system 60 that supplies pressure to brakes at the axle when the tow vehicle slows. The brake booster system 60 is actuated by the momentum of the container 10 pushing forward as the tow vehicle slows. Sliding action in the beam 54 allows the cylinder of the booster system to press brake fluid to the axle. The booster system 60 is connected to the container via a quick connect fitting 62 that prevents the user from needing to re-bleed the brake system when attaching or detaching the tongue assembly 50. This type of brake system allows a vehicle that is not equipped with an electronic trailer brake system to safely tow the container. The main members of the tongue assembly 50 are connected to each other using pinned connections, rather than welds, bolts or other means. This allows the user to attach and set up the tongue assembly 50 without the use of tools. The assembly can be broken down into portions light enough that a single person may be able to set up and deploy the unit by themselves if needed, and without the need for special tools.

Additionally, different styles of hitch attachment are useful in the present system. In one embodiment, the hitch described is in the "bumper tow" category, that is, it uses a pintle hitch or similar coupler to attach to the tow vehicle at a point near the bumper. Other options for hitch attachment could include a goose neck style hitch, or a fifth wheel-style hitch.

The container module 10 may preferably be an ISO shipping container, as described herein, and may further contain any items or equipment as desired. In a preferred embodiment, the container module 10 may contain elements of a mobile cellular tower and monitoring station, including work space, electronic viewing monitors, power supplies, storage areas, extendable antennae, or any other equipment useful to deploy a mobile cellular tower and monitoring station. Thus, the container module 10 of the present invention may be towed into any suitable location through the use of the deployable/retractable moving apparatus 20 and a tow bar assembly 40 or removable tongue assembly 50, and positioned through the use of the support pedestals 30. When the container is disposed in the preferred location, the deployable/retractable moving apparatus 20 retracts the associated wheels 22, and the tongue assembly 50 is removed and stowed, making the container a semi-permanent structure. When the time comes to move the container 10, the support pedestals 30 are retracted, the deployable/retractable moving apparatus 20 deploys the associated wheels 22, and the tongue assembly 50 is reattached, allowing the container to become mobile.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

The invention claimed is:

1. A system for converting a stationary unit to a mobile unit and a mobile unit to a stationary unit, the system comprising:
    a container having an interior space;
    a deployable/retractable apparatus disposed within the interior space, wherein the apparatus is adjustable between a horizontal stowed position within the interior space and a vertical deployed position outside of the interior space;
    a leveling apparatus movable between a upward retracted position within the interior space to a downward extended position outside of the interior space for supporting the container on a landing surface when the deployable/retractable apparatus is in the horizontal stowed position; and,
    a removable tow bar assembly comprising:
        a main frame formed from opposing legs having a first end and a second end, wherein the legs join forming an apex at the first end, and attach separately at the second end on opposing sides of the container at attachment points; and,
        a central beam connected to the legs at the apex at one end and to a front of the container at a second end, the central beam housing a brake booster system; and,
        a hitch attachment at the apex of the main frame.

2. The system of claim 1, wherein the deployable/retractable apparatus comprises an axle having at least one wheel attached to the axle through a rotatable arm, wherein the wheel is rotatable between a upward stowed position and a downward deployed position.

3. A system for converting a stationary unit to a mobile unit and a mobile unit to a stationary unit, the system comprising:
    a container having an interior space comprising a first side, a second side opposite the first side, a front end and a back end opposite the front end;
    a first independent axle having at least one wheel attached to the first independent axle through a rotatable arm, wherein the wheel is rotatable through the rotatable arm between a upward stowed position within the interior space and a downward deployed position outside of the interior space, the first independent axle positioned proximal to the first side of the container;
    a second independent axle having at least one wheel attached to the second independent axle through a rotatable arm, wherein the wheel is rotatable through the rotatable arm between a upward stowed position within the interior space and a downward deployed position outside of the interior space, the second independent axle positioned proximal to the second side of the container;
    a leveling apparatus movable between a upward retracted position within the interior space to a downward extended position outside of the interior space for supporting the container on a landing surface when the deployable/retractable apparatus is in the horizontal stowed position; and,
    a removable tow bar assembly comprising:
    a main frame formed from opposing legs having a first end and a second end, wherein the legs join forming an apex at the first end, and attach separately at the second end on the front end of the container at attachment points; and,
    a central beam connected to the legs at the apex at one end and to the front end of the container at a second end, the central beam housing a brake booster system; and
    a hitch attachment at the apex of the main frame.

4. The system of claim 3, wherein the first independent axle and the second independent axle are each disposed within separate areas of the interior space.

5. The system of claim 4, wherein the first independent axle and the second independent axle are each disposed within opposing areas of the interior space.

* * * * *